United States Patent [19]

McEwan

[11] 4,192,400
[45] Mar. 11, 1980

[54] JUMP-PROOF ELECTRICAL DISENABLING SYSTEM

[76] Inventor: John A. McEwan, 1808 White Oaks Dr., Alexandria, Va. 22306

[21] Appl. No.: 876,537

[22] Filed: Feb. 9, 1978

[51] Int. Cl.² .............................................. B60R 25/04
[52] U.S. Cl. .............................. 180/287; 307/10 AT; 340/64; 200/44
[58] Field of Search .................. 180/114; 307/10 AT; 200/42 R, 44; 70/DIG. 46; 340/63, 64, 168 S; 70/271

[56] References Cited

U.S. PATENT DOCUMENTS

| 3,669,211 | 6/1972 | Gilgoff | 180/114 X |
|---|---|---|---|
| 3,691,396 | 9/1972 | Hinrichs | 307/10 AT X |
| 3,718,202 | 2/1973 | Brock | 180/114 |
| 3,749,930 | 7/1973 | Roe | 307/10 AT |
| 3,766,400 | 10/1973 | Walters | 307/10 AT |
| 3,773,138 | 11/1973 | Killmeyer | 180/114 |
| 3,803,551 | 4/1974 | Jordan | 180/114 X |

*Primary Examiner*—Albert J. Makay
*Assistant Examiner*—Edmond G. Rishell, Jr.

[57] ABSTRACT

The invention is an anti-theft system for motor vehicles and incorporates an electronic key which by virtue of a pre-coded shift register contained therein, and with the aid of an electronic clock contained within the vehicle can deliver this code as a series of impulses through a single output line to a decoder which is housed together with a disenabling gate inside the distributor or the starter motor casing to prevent circumvention of the electronic disenabling system.

7 Claims, 3 Drawing Figures

JUMP-PROOF ELECTRICAL DISENABLING SYSTEM

BACKGROUND OF THE INVENTION

Automobile and other vehicle ignition key systems typically provide a mechanical key which is required to bridge an otherwise open portion of the ignition circuit. This type of key system, although quite traditional and recently coupled with steering wheel locking mechanisms, is nevertheless subject to bridging or "jumping" by thieves. With the advent of electronics, systems have been developed utilizing a complicated key card or other device having a multiplicity of connections with a dashboard receiving socket or receptacle which in one fashion or another provides an electronic or electrical code to a decoder within the automobile, thus enabling the ignition. These keys ordinarily have at least one contact per digit of code, plus power contacts.

However typically these devices suffer from the drawback of having a rather complicated and perhaps delicate key, and also are subject to decoding by means of high velocity scanning devices which are not at all a rarity among electronic buffs. In addition there is the obvious degree of complexity of circuitry involved in this type of disenabling mechanism. Most importantly however, is the fact that these systems can be jumped or hot wired. They lack the degree of integration with the system they are trying to protect that is required to make their circumvention impossible.

SUMMARY OF THE INVENTION

The present invention provides an electronic key in the form of a simple jack which is impossible to misapply. The jack contains a pre-coded shift register which is energized upon the insertion of the jack, and a clock is simultaneously energized to shift the code on the register to a second decoder shift register which is disposed in the ignition system, preferably inside the distributor or in another location where bypass is impossible because the decoder is incorporated directly at a point that is fundamental to the car's electrical system and whose function is required to operate the car. The point of installation of the decoder in the car's electrical system should be in a component that cannot be readily removed and replaced with another, unprotected similar device. The distributor or the starter motor provide good locations for decoder installations.

The decoder includes a shift register which is wired to an AND gate in such a way that the code is incorporated in the circuit, and the AND gate delivers a signal through a delay device, which is rather important to the invention, to a silicon controlled rectifier or other gate-acting element which permits the normal flow of current in the starter motor relay (housed with the starter motor) or the ignition circuit.

DESCRIPTION OF THE PREFERRED EMBODIMENT

Figure 1:
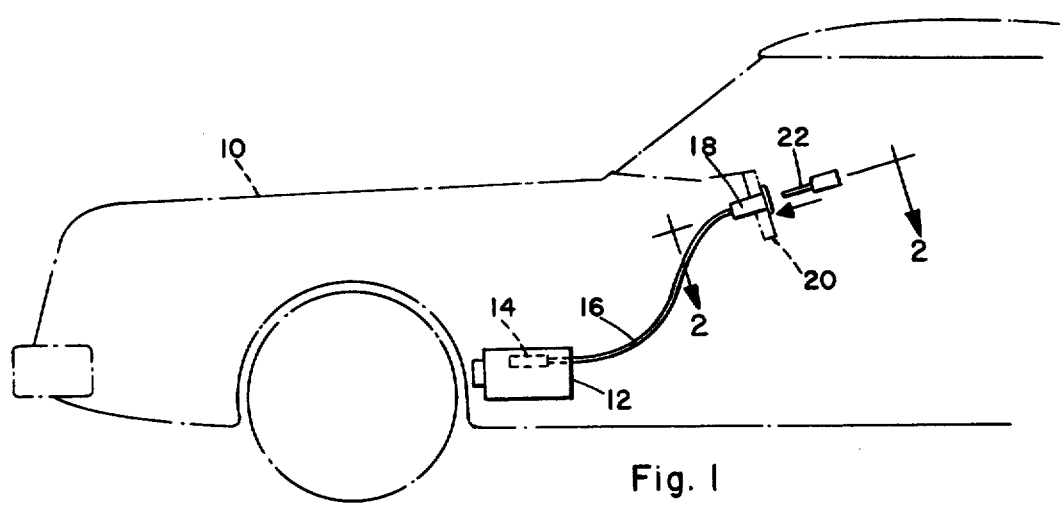
FIG. 1 illustrates the system as installed in a vehicle starter motor.

An automobile is diagrammatically illustrated at 10 in FIG. 1 having a starter motor at 12. The decoder portion of the disenabling device and a gate element activated by the decoder are shown encased at 14 within the housing of either the distributor (not shown) or the starter. Connecting wires 16 lead from the disenabler 14 to a receptacle 18 in the dashboard 20 of the vehicle. An electronic key 22 fits within the receptacle to activate the disenabler 14.

The purpose of the illustration of FIG. 1 is to demonstrate that the disenabler portion 14 of the circuit is physically disposed within a protective enclosure right at the site where power is delivered to prevent bypass of the system short of dismantling the casing around the disenabler circuit. This is true because in order to otherwise bypass the disenabling mechanism, the proper code would have to be delivered through the connecting wires 16. This cannot be done as it is not possible to determine the correct code from an inspection of any of the exposed circuitry.

Ideally, the decoder and disenabler circuits can be incorporated in the present day electronic pointless ignition circuit hermetically sealed as a single unit, integral with the rest of the distributor (i.e. transformer and linkage housing). By using two or more disabling circuits, more than one circuit can be simultaneously disabled in both the starter and the ignition.

Figure 2:
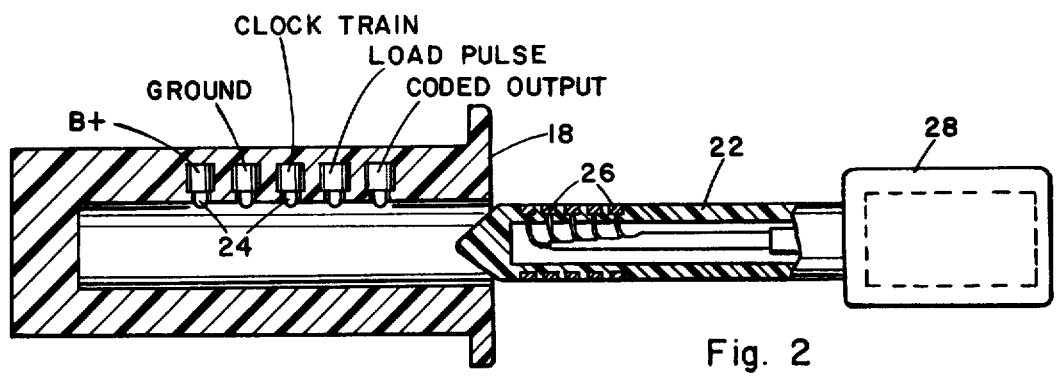
FIG. 2 is an enlarged sectional view taken on line 2—2 of FIG. 1.

FIG. 2 details the physical construction of the receptacle 18 and the key 22 wherein a plurality of contacts 24, being five in number, line the interior wall of the socket or receptacle 18 and mate with corresponding contacts 26 in the jack-like key 22. All of this is diagrammatically illustrated, as are the wire connectors which make contact with the main body 28 of the key which contains the actual coding mechanism.

Figure 3:
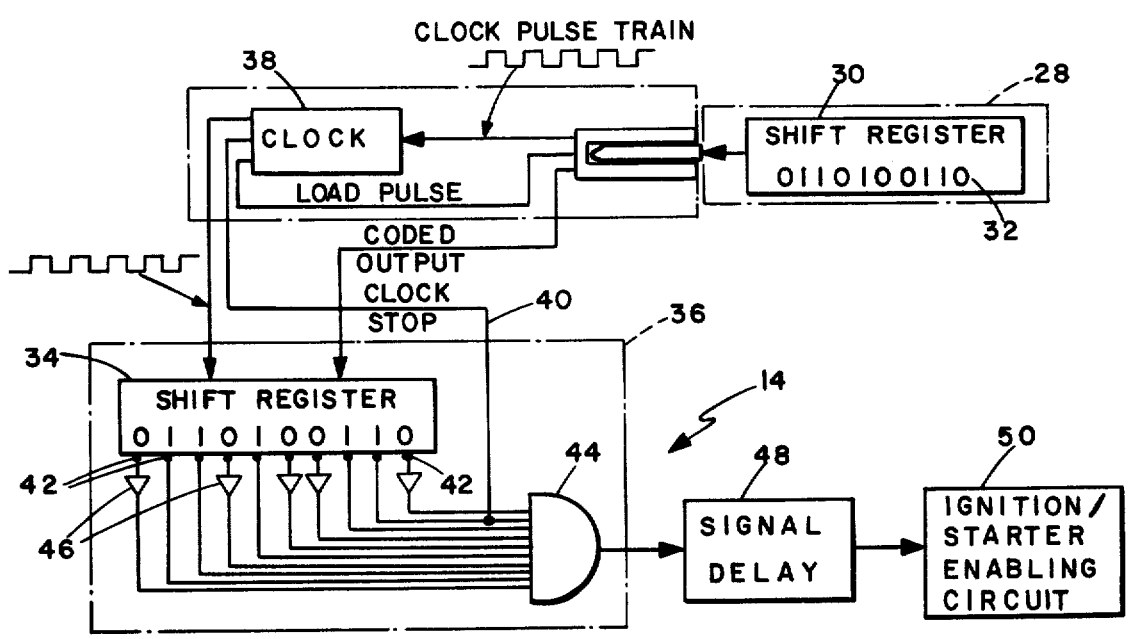
FIG. 3 is a schematic wiring diagram of the system.

This coding mechanism is simply a shift register diagrammatically illustrated at 30 in FIG. 3. This shift register is manufactured with a binary number such as the ten-digit number illustrated at 32 already on the register so that upon being energized by one of the contacts 24 which connects to the vehicle power, the shift register is loaded with the code and ready to go.

A second shift register 34 comprises part of a decoder 36. An electronic clock 38 which produces a pulse train in well known fashion is mounted in the vehicle and connected to both shift registers. The shift registers are also interconnected such that upon the activation of the clock, which is accomplished automatically by insertion of the jack in the socket, the generated pulse train causes the binary number indicated at 32 to be transfered bit by bit into the second shift register 34.

A clock stop mechanism comprises a disenabling gate or the equivalent which is activated by line 40. This line connects with the last of the bit stations or terminals 42 which according to the particular code number used represents a positive bit. In this fashion the clock is shut off after the pulse train has completely shifted the digital code from the first register to the second thereby preventing the process from continuing.

The decoder 36 also includes an AND-gate 44 whose input terminals connect to the bit terminals 42 of the second shift register 34. The particular code used is incorporated in the decoder by means of the positioning of inverters 46 at the negative bit stations so that upon loading the proper binary code signal, the AND-gate will activate and deliver a signal to a delay line 48. This delay element is of any conventional type and is intended to prevent the transmission of the activated AND-gate's signal for a prescribed period of time to the SCR 50 or other gate-acting element which is disposed in the starter or ignition system of the vehicle. This action requires the AND-gate to remain activated for at least the aforementioned prescribed interval of time if its signal is to be transmitted to the gate-acting element. Therefore, the code applied to the decoder must remain unchanged for that period of time. By incorporating a delay (the prescribed period of time) of about one second, it would clearly be impossible for a person using a scanner to produce in rapid sequence all the possible code combinations represented by a 10 digit binary number. Due to the enormous speed at which electronic components function, with a delay of one second or even less, scanning would be impossible.

Although the details of the invention as set forth are subject to some variation within the ordinary capabilities of electronic engineers, the novelty of the present system is believed to reside in the incapsulation of the decoding system at such a point within the vehicle as to practically physically and electronically prevent circumvention, in the provision of a single-line electronic combination delivering system which does not require multiple parallel connections between the key and the vehicle.

Aside from the other particulars of the electronics used, the incorporation of the signal delay 48 is believed to have significance to the practicality of the invention and its ultimate fool-proof nature. It should also be noted that a variation of the system is possible in which the code is produced not by a shift register but by a manual push-button input or the like, wherein the pulse train is created by the operation rather than a pulse clock operating through a coded shift register.

Obviously many modifications and variations of the present invention are possible in the light of the above teachings. It is therefore to be understood that within the scope of the appended claims the invention may be practiced otherwise than as specifically described.

In order to summarize the functioning of the system, reference should be made to the labeled contacts of the socket 18. The B+ and GROUND contacts provide power for the key. The "CLOCK TRAIN" terminal introduces the pulse train from the clock to the key, and upon a trigger signal being delivered through the LOADPULSE terminal, the code is delivered through the OUTPUT terminal to the decoding register.

I claim:

1. An anti-theft system for a protected system which has at least one essential electrical sub-system said anti-theft system comprising:
    (a) an electronically controlled gate-acting element interposed in said sub-system and operable between a closed mode permitting normal operation of said sub-system and an open mode disenabling said sub-system;
    (b) an electronic key and a receptacle to receive said key, said key containing a pre-determined code and being capable of reproducing said code as a coded chain of electrical pulses and delivering said chain of pulses to said receptacle;
    (c) a decoder electrically coupled to said receptacle for receiving said coded chain and producing an enabling signal to said gate-acting element whereby the latter is thrown into its closed mode and said sub-system is restored to normal operating capacity;
    (d) wherein said key contains a precoded shift register and said decoder includes a second shift register electrically coupled through said receptacle to said pre-coded shift register, and including an electronic clock electronically coupled to said pre-coded shift register through said receptacle to said second shift register to simultaneously deliver a stepping pulse to both registers to effect the shift of said coded chain of electrical pulses from said pre-coded shift register to said second shift register.

2. A system according to claim 1 wherein said decoder and said gate-acting element are together disposed in a housing to prevent bypassing said decoder to activate said gate-acting element.

3. A system according to claim 2 wherein said essential electrical sub-system comprises an engine starting system including a starter motor and said housing comprises the housing for said starter motor.

4. A system according to claim 1 and including an electronic signal delay means interposed between said decoder and said gate-acting element to delay the enabling of said gate-acting element after receipt by said decoder of the proper code, whereby said anti-theft system is immune to circumvention by high speed scanning mechanisms.

5. A system according to claim 1 wherein said decoder further includes an AND-gate and said second shift register has the bit terminals thereof connected to the inputs of said AND gate, therebeing inverters connected between certain of said bit terminals and said AND-gate to acknowledge the shift code.

6. A system according to claim 1 wherein said receptacle is mounted in the dashboard of a vehicle and said electronic clock and power supply are also mounted in the vehicle and electrically connected to said receptacle to make contact with said key when inserted in said receptacle.

7. A system according to claim 1 and including a clock stop element for terminating the counting of said clock subsequent to said coded pulse chain being shifted, said clock stop element being activated by a signal from the last bit terminal of said second shift register coded to receive a positive bit upon the actual loading of said positive bit.

* * * * *